(12) United States Patent
Merica

(10) Patent No.: US 8,365,482 B2
(45) Date of Patent: Feb. 5, 2013

(54) INTEGRATED CURTAIN WALL AND WIREWAY DISTRIBUTION SYSTEM

(76) Inventor: Anne Elliott Merica, Arlington, VA (US)

( * ) Notice: Subject to any disclaimer, the term of this patent is extended or adjusted under 35 U.S.C. 154(b) by 0 days.

(21) Appl. No.: 13/108,775

(22) Filed: May 16, 2011

(65) Prior Publication Data

US 2011/0214385 A1 Sep. 8, 2011

Related U.S. Application Data

(63) Continuation of application No. 10/530,872, filed as application No. PCT/US03/32481 on Oct. 14, 2003, now Pat. No. 7,941,982.

(60) Provisional application No. 60/417,872, filed on Oct. 11, 2002.

(51) Int. Cl.
*E04H 1/00* (2006.01)
*E04C 2/52* (2006.01)

(52) U.S. Cl. ..... 52/235; 52/220.2; 52/220.7; 52/204.53; 52/770; 52/745.19; 52/745.2

(58) Field of Classification Search ............... 52/745.15, 52/745.01, 745.05, 745.19, 718.07, 718.02, 52/718.03, 235, 210, 211–212, 204.53, 204.1, 52/220.1, 220.3, 220.7, 220.8, 745.2, 220.2; 174/95–97
See application file for complete search history.

(56) References Cited

U.S. PATENT DOCUMENTS

| 3,195,698 | A | | 7/1965 | Codrea |
| 3,600,854 | A | | 8/1971 | Dallaire et al. |
| 4,291,511 | A | | 9/1981 | Stoakes |
| 4,377,926 | A | | 3/1983 | Coulston et al. |
| 4,545,161 | A | | 10/1985 | Baumann |
| 6,158,182 | A | * | 12/2000 | Biebuyck ......................... 52/235 |
| 6,469,250 | B1 | * | 10/2002 | Decore et al. .................... 174/95 |
| 2002/0129573 | A1 | * | 9/2002 | Biebuyck .......................... 52/235 |

OTHER PUBLICATIONS

Gregory Kiss and Jennifer Kinkead, "Optimal Building-Integrated Photovoltaic Applications", National Renewable Energy Laboratory, Golden, CO (1995).
"Weatherproof Boxes & Covers, Boxes, Single & Two Gang", SF2304R1, Jan. 2004, Legrand/Pass & Seymour, Syracuse, NY.
"Convia® Enabled Walkerflex® Modular Wiring System", ED1595, Jul. 2009, Legrand/Wiremold, West Hartford, CT.
"Walkerflex® Modular Wiring System", ED755R10, Sep. 2009, Legrand/Wiremold, West Hartford, CT.
"1600 PowerWall® First Proven curtain Wall to Harness the Energy of the Sun", 2009, Kawneer Company, Inc., Norcross, GA.
"1600 Wall System®", EC 97911-21, Sep. 2010, Kawneer Company, Inc., Norcross, GA.
"1600 Wall System®", EC 97909-16, Jan. 2010, Kawneer Company, Inc., Norcross, GA.
"300ES CURTAINWALL Fabrication and Installation Instructions", Tubelite Inc., Walker, MI (downloaded from http://www.tubeliteinc.com/product_types/crw_300ES/300ES_InstallationInstructions.pdf on Nov. 2010).

* cited by examiner

*Primary Examiner* — Jeanette E. Chapman
(74) *Attorney, Agent, or Firm* — Buchanan Ingersoll & Rooney PC

(57) ABSTRACT

A curtain wall including an extruded aluminum sill having a first channel for receiving a glazed panel, a sill anchor/access portion for securing the sill to a poured concrete slab or slab wall, and toward the interior side of the sill, a wireway is defined in part by the sill and in part by a wireway cover for concealing power and/or data/telecommunication cables. The wireway cover may also include outlet devices or plugs arranged in a longitudinally spaced relationship.

8 Claims, 4 Drawing Sheets

INTEGRATED CURTAIN WALL AND WIREWAY DISTRIBUTION SYSTEM

TECHNICAL FIELD

The present invention pertains to curtain walls used for building exteriors and, more particularly, to an improved curtain wall having a wireway distribution system integrated therewith.

BACKGROUND ART

Curtain walls are typically constructed of extruded aluminum frame support members having generally U-shaped channels for supporting a plurality of panel members that serve as the exterior of a building. Such panel members are most often panes of glass, but other paneled building materials such as aluminum, granite, slate, or concrete are also utilized. Such panel members are often of identical size and shape. However, near doors, opening windows, or other access points into the building, panel members of different sizes an shapes may be utilized.

More specifically, such curtain walls generally include a horizontal sill member having an upwardly facing U-shaped channel at the bottom of a wall section, a horizontal head member having a downwardly facing U-shaped channel at the top of a wall section, and a plurality of vertical mullions running between the sill and head members. Panel members are supported by the U-shaped channels of the sill member and the head member, and the vertical joints between adjacent panel members are formed at the mullions. Typically, the mullions are disposed interiorly of the sill member, the head member, and the panel members so that only the joint between adjacent panel members, and not the mullions themselves, are visible from the exterior of the building.

An exemplary, conventional curtain wall is described and shown in U.S. Pat. No. 6,158,182, the entire contents of which are hereby incorporated by reference. As described therein, and with reference to FIG. 1, a sill member 10 is illustrated for securing a curtain wall to a concrete slab 12. Although not shown in FIG. 1, a head member similar to sill member 10 secures the curtain wall to a concrete slab between floors of a building or other building structure, and a plurality of mullions span between sill member 10 and the head member. Sill member 10 is typically formed as an integral aluminum extrusion. Sill member 10 generally includes a channel section 14, an anchoring section 16 disposed interiorly of channel section 14, and a cover 18.

Channel section 14 and cover 18 cooperate to secure a panel member 20 to sill member 10. More specifically, channel section 14 includes a base 14a and two legs 14b and 14c that form a upwardly facing U-shaped channel. A support member 22 rests on the top surface of base 14a. Leg 14b has a groove 24 proximate the upper end of its interior surface, and leg 14c has a support surface 26 proximate the upper end of its interior surface. Cover 18 has a downwardly depending resilient leg 28 that engages a groove 30 on the exterior surface of leg 14c. Cover 18 also has a tongue 32. Panel member 20 is supported within channel section 14 via setting block 34 and resilient gaskets 36 and 38. Setting block 34 is disposed on the top surface of support member 22. Resilient gasket 36 has a tongue 36a that engages groove 24 of leg 14b. Resilient gasket 36 is typically pre-installed in groove 24 of leg 14b during manufacturing of sill member 10. Resilient gasket 38 has a groove 38a that engages tongue 32 of cover 18 and a surface 38b that mates with surface 26 of leg 14c. Channel section 14 further includes a plurality of support legs 40 below base 14a.

Anchoring section 16 includes a base 16a, a leg 16b, and a plurality of support legs 42 below base 16a. Base 16a has a plurality of holes 44 spaced along its length for receiving bolts or fastening means 46, and the diameter of each hole 44 may either be substantially identical to the diameter of a threaded shank 46a of each bolt 46, or the hole 44 may be slotted to allow for horizontal adjustment of the sill position. Leg 16b has a groove 48 for receiving a tongue 49 of cover 18.

The following technique is typically used to install a panel member 20 of such a conventional curtain wall. First, sill member 10 is laid on a shim 56 in the proper position on slab 12 and is used as a template to drill holes into slab 12 for each bolt 46. One should note that shim 56 does not run continuously along the length of sill member 10. Instead, shim 56 is used at low points of slab 12 to level sill member 10, if necessary. Next, sill member 10 is removed from shim 56, and a hole 50 with a larger diameter is drilled in the place of each of the holes drilled using sill member 10. A structural insert 52 is then secured within each of holes 50 via epoxy or other conventional means. Each insert 52 has an internally threaded hole 54 for receiving bolts 46. Sill member 10 is then repositioned on shim 56 and secured to slab 12 using bolts 46. A sealant 58 is disposed on slab 12 along both the exterior and interior sides of shim 56 and a head member similar to sill member 10 may also be secured to part of the building structure using the above-described techniques. Thereafter, vertical mullions are secured between sill member 10 and the head member at appropriate intervals along the curtain wall. A support member 22 is disposed on base 14a of sill member 10, and setting block 34 is disposed on support member 20. Panel member 20 is then installed from the exterior of the building, typically first being tilted into the channel section of the head member, and then being dropped into channel section 14 of sill member 10. The cover 18 can then be installed in sill member 10, and a glazing stop is installed in the head member of the curtain wall. Finally, resilient gasket 38 is disposed on tongue 32 of cover 18 of sill member 10, and a similar gasket is disposed on the tongue of the glazing stop of the head member.

Of course, multiple panel members 20 are typically arranged side-by-side and are secured and sealed between sill member 10 and the head member in this manner, with their vertical joint overlapping at a mullion. This vertical joint must then be sealed from both the interior and exterior of the building using both resilient gaskets and/or structural silicone.

Current means of architectural glazing with metal framing generally include three types of systems: individual window units or ribbon windows; storefront or entry systems with structural capacity to span one or two vertical levels; and curtain wall systems which are self-supporting over the entire height of the building, as described above. As used broadly herein, "curtain wall" is understood to refer to all types of glazing systems with metal framing and "sill" is understood to refer to either a horizontal or vertical sill member depending upon the particular construction. Advantages of these systems over older wood or solid metal framing include increased glass areas for providing natural light to building interiors, structural capacity to support insulated glazing, and resistance to temperature and water infiltration. While such systems, and other conventional curtain walls, have proved to be reliable commercial building systems, they suffer from several drawbacks. One particular drawback of these types of systems is the limited opportunity to provide power and/or data to the predominate exterior walls of the building, unless a separate metal stud and finish partition, with conventional conduits and outlets, is created between or under the window system, which thereby requires increased labor for installation and destroys the aesthetic appeal created by the curtain wall and increased glass area.

DISCLOSURE OF INVENTION

The present invention overcomes the drawbacks of the prior wall structures by having a sill defining a channel for supporting a wall panel, the sill having a structural portion alongside the channel for securing the sill in place, and the sill further comprising an inwardly open recess defined by the sill inwardly of the channel and the structural portion thereof. A cover is provided for the recess, to thereby define at least one wireway for power and/or data/telecommunication cables. Still further, the cover may include outlet devices provided in openings defined for this purpose in the cover.

BRIEF DESCRIPTION OF DRAWINGS

These and other objects, features, and advantages of the present invention will become more readily apparent to those skilled in the art upon reading the following detailed description, in conjunction with the appended drawings in which.

BEST MODE FOR CARRYING OUT THE INVENTION

Figure 1:
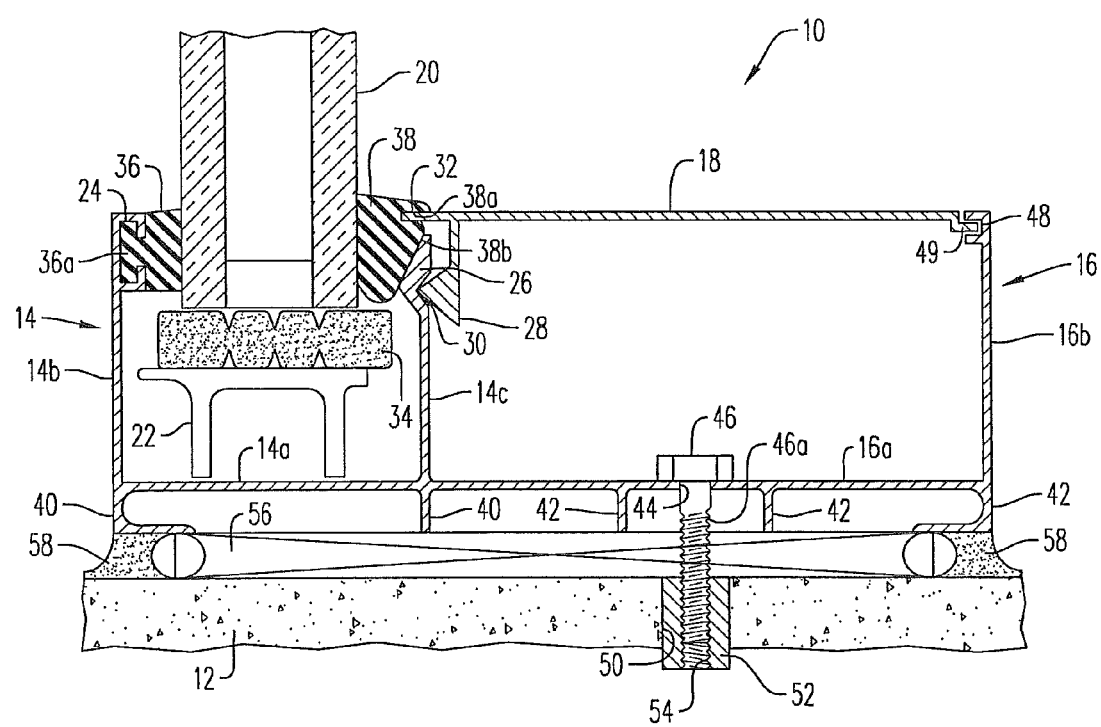
FIG. 1 is a schematic, cross-sectional view of a sill member of a conventional curtain wall.
Figure 2:
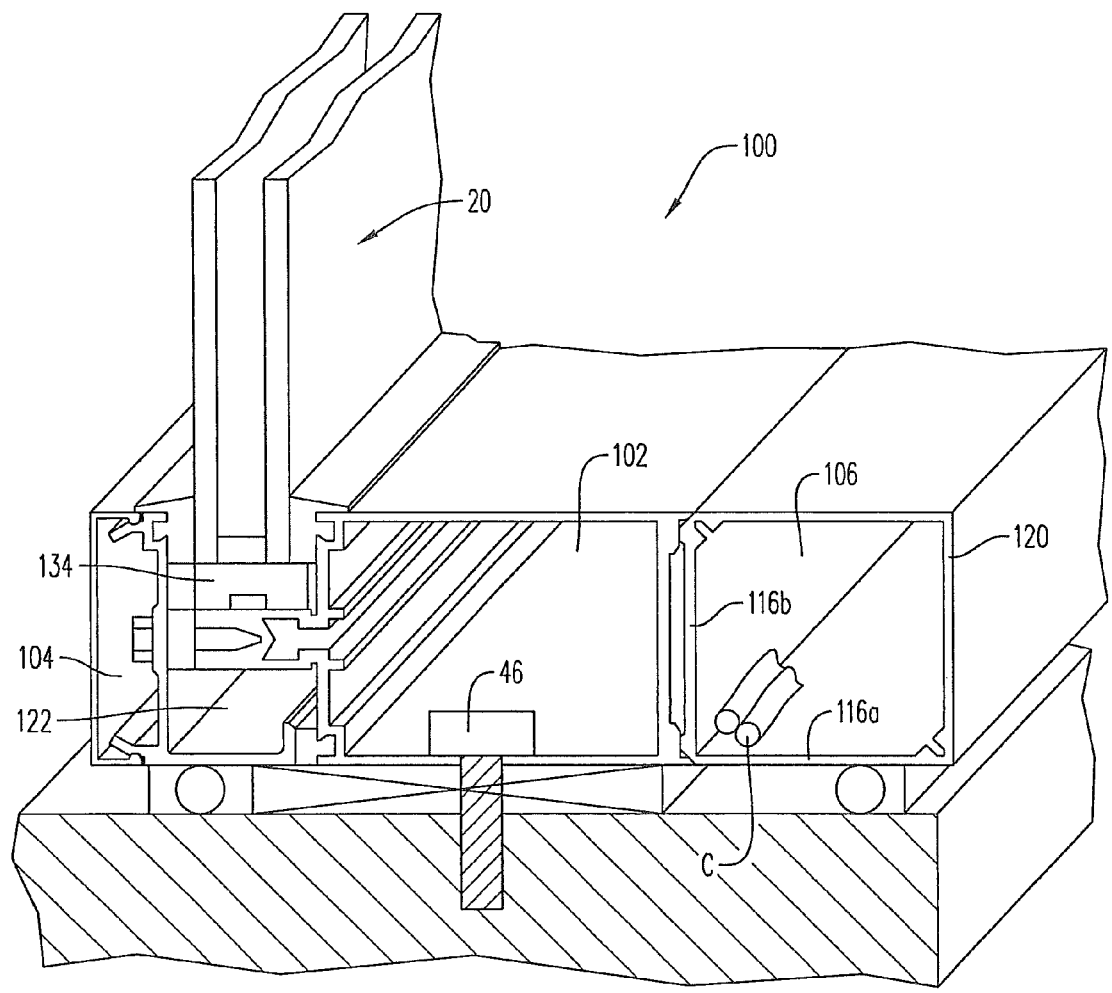
FIG. 2 is a schematic, cross-sectional view of a sill member in accordance with a preferred embodiment of the present invention.

Referring to FIG. 2, the sill structure of the present invention is shown generally by reference numeral 100. Preferably, the glazed panel 20 is supported on a platform 122 via a support pad 134 or similar structure, similar to the previously described prior art structure of FIG. 1. Further, the sill structure 100 includes the same or a similar type of upwardly open channel arrangement for receiving the panel and its platform, such as described previously with reference to FIG. 1. The specific construction of the sill structure may vary from that shown in the illustrated embodiments or described as the prior art, however, without departing from the scope of the present invention. A channel 102 preferably spaced inwardly of the glazed panel 20 serves to provide access to the anchor bolt 46, in the same or similar manner as described above with reference to the prior art embodiment. The sill structure 100 as illustrated discloses a standard type of mullion used for supporting a glazed panel 20 from either the top or bottom thereof, and which allows the glazed panel to be mounted either horizontally or vertically. A cap 104 may be provided on the front surface thereof having a decorative or other specified profile.

In accordance with the present invention and as shown in FIG. 2, the sill 100 further includes a recess 106 that opens inwardly toward the building's interior space. This recess is defined by side wall member $116_b$ and bottom wall member $116_a$. The marginal edge portions of these walls $116_a$ and $116_b$ are so formed as to receive a removable cover panel 120. The cover panel 120 may be of the same material as that which defines the sill (extruded aluminum), or may instead comprise a non-metallic synthetic polymeric material, or other material, without departing from the scope of the present invention. The cover panel 120 may have a ninety degree angle, as illustrated, in order to resemble a convention sill profile or, as will be appreciated by one skilled in the art, any other profile or angular surface connecting the marginal edge portions of walls $116_a$ and $116_b$ may also be used. For instance, a generally trapezoidal cross section may be defined by cover 120 for the wireway. The marginal edges of the walls may further define sockets, one of which pivotally receives the cover for opening and closing movement such that the lower marginal edge pivots and the upper marginal edge provides a latching connection.

As thus constructed and arranged, a wireway is defined in the sill 100 for receiving a plurality of cables or conductors C. These cables C may be used to feed electrical power to outlet devices which are provided for the convenience of those occupying the interior space of the building, such as outlet plug 130 (see FIG. 3) provided on the side wall of cover 120. Alternatively, data/telecommunication jacks 132 (see FIG. 3) may be provided in a similar fashion. It will be apparent that these plugs, outlet devices, and/or jacks can also be provided in one or more walls of the cover 120, such as the top wall and the side wall, within the scope of the present invention. The wireway defined by the legs $116_b$ and $116_a$ of the sill 100 can be reconfigured to enlarge or otherwise alter the cross sectional area of the wireway. The shape can be configured to accommodate raceway covers for various raceways available from current manufacturers. A further advantage of this wireway distribution system is the flexibility allowed by the removable cover 120 to install or modify the wiring at any subsequent stage of construction.

Figure 3:
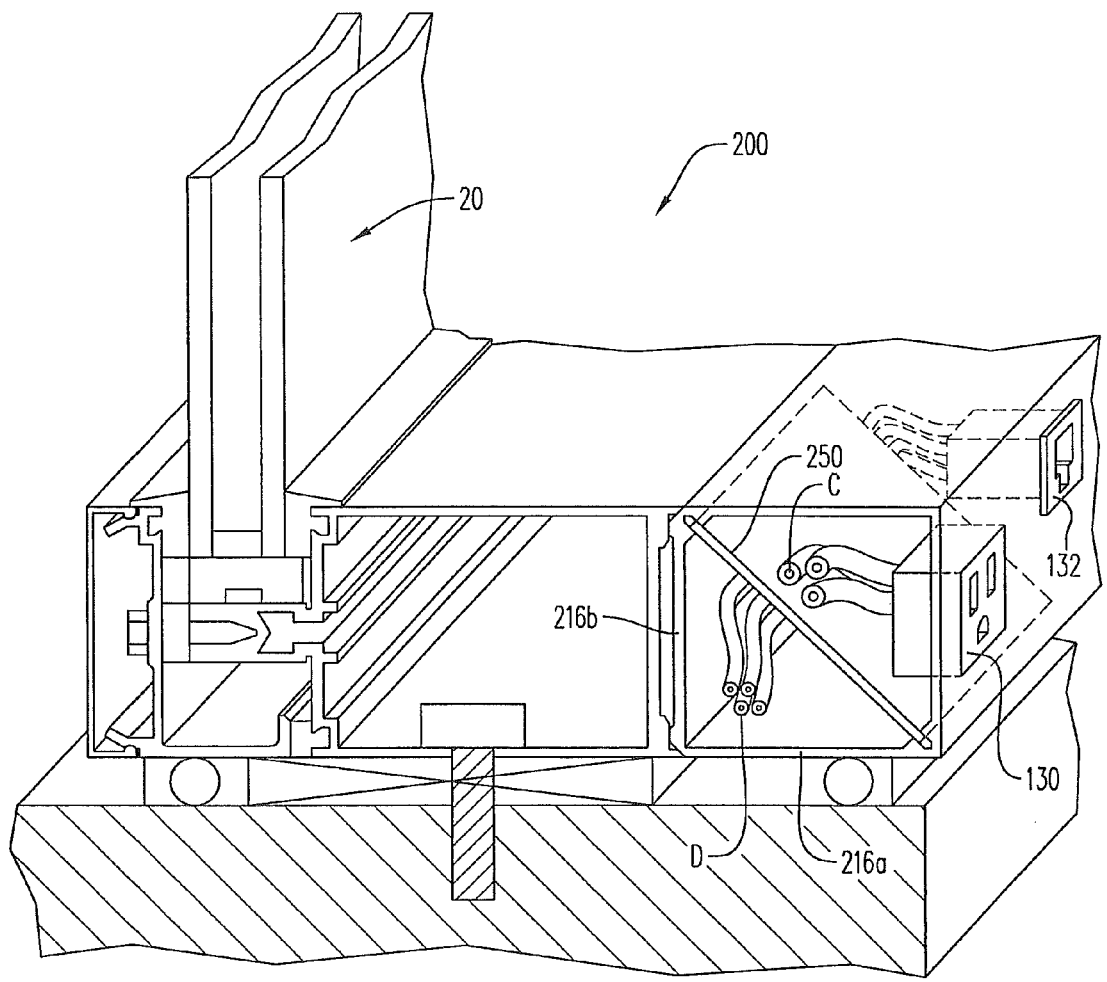
FIG. 3 is a schematic, cross-sectional view of a sill member in accordance with a further preferred embodiment of the present invention.

With further reference to FIG. 3, a divider 250 is provided in this embodiment of the sill 200 of the present invention to provide separate wireways for the data/telecommunication cabling D and the power cables C. The opposing walls $216_a$ and $216_b$ are preferably provided with recesses or other attachment means extending longitudinally along the sill for receiving divider 250, which is shown extending diagonally through sill 200. As should be apparent, other divider 250 configurations are also contemplated as within the scope of the present invention. Preferably, divider 250 is comprised of a metal or resilient polymeric material so as to provide electro-magnetic shielding between the cabling D and the cables C, although any material capable of eliminating electro-magnetic interference could also be used.

Figure 4:
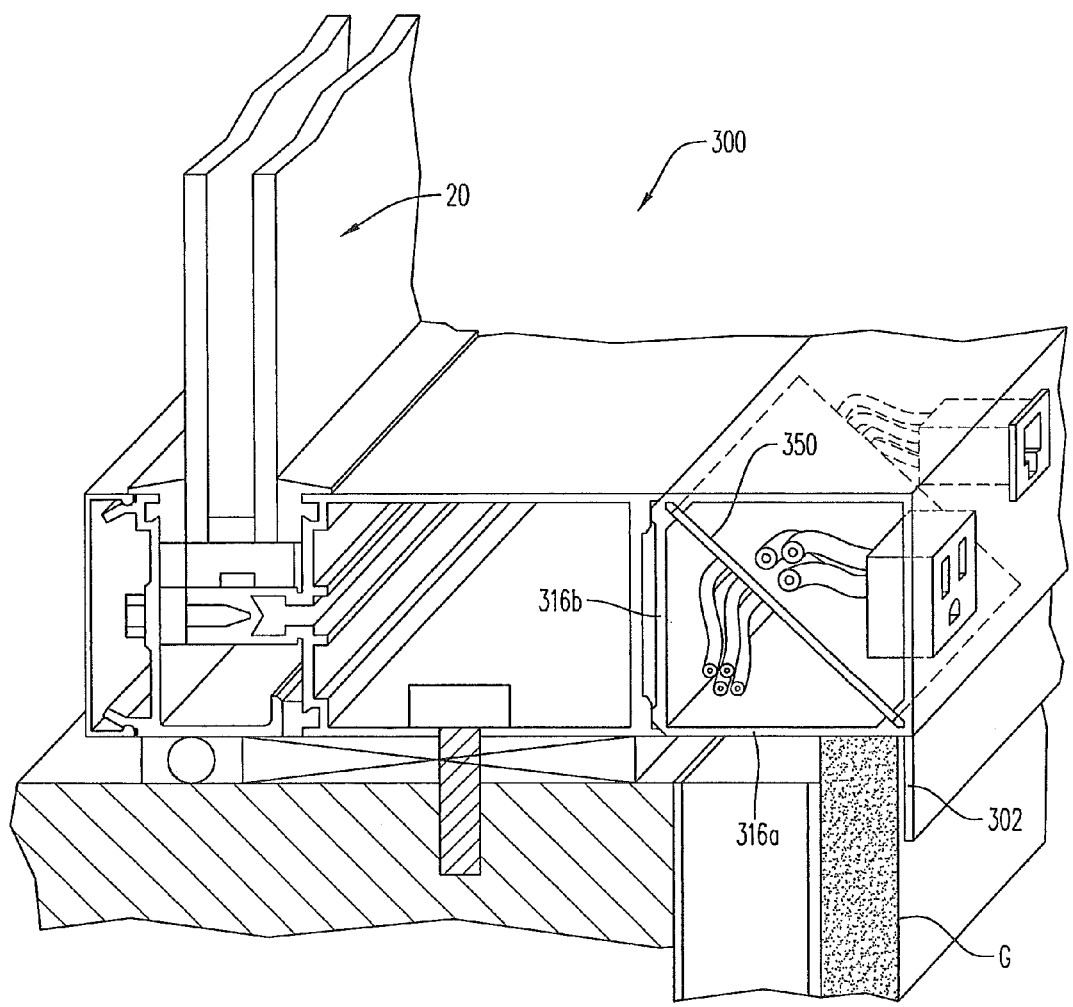
FIG. 4 is a schematic, cross-sectional view of a sill member in accordance with a still further preferred embodiment of the present invention.

FIG. 4 illustrates still another wireway configuration for a sill 300 that has generally the same geometry as the previously described embodiments for supporting the glazed wall panel 20. At the interior or inner marginal portion of the sill defined by walls $316_a$ and $316_b$ a divider 350 may similarly be provided within the raceway as suggested for the embodiment of FIG. 3. In addition, sill 300 includes an extending lip 302 which simplifies the installation of gypsum board G abutting with the sill 300. More particularly, rather than requiring the gypsum board, or other wall material, to wrap around the sill at ninety degree angles, the lip 302 allows the gypsum board to merely extend straight into an abutting relationship with the bottom surface of the sill 300, and the lip 302 then conceals the joint. The lip 302 as illustrated is substantially planar, however, any decorative, bullnose, or other desired profile could of course also be used.

The embodiments described by the present invention modify a removable sill channel typically used to conceal the bolts attaching the frame to the floor slab below. Similar snap-in finish channels are used on the vertical framing to match the sill frame and provide a unified appearance, and these framing members are often extended in depth to conceal gaps or edges of rough underlying structures. The present invention modifies the removable channel to allow wiring to run in the cavity formed by the extrusion. Thus, the horizontal and vertical window framing effectively forms a similar grid of conduit for power and data supply to the exterior wall. As will be appreciated, the specific channel profile will vary slightly, due to proprietary details of each framing manufacturer, however the concept and operation remains the same regardless of the system. The hollow channel may be used for low or standard voltage power, or data individually, or may be separated by a divider plate to prevent electromagnetic interference between the lines. A secondary advantage of this window channel supply system is the flexibility allowed by the removable cover to install or modify the wiring at any subsequent stage of construction. Standard receptacles for power or data plugs may be cut into the sill at any point along the length of the member, or the channel may be used as conduit only, with junction boxes concealed behind a finish wall or ceiling surface.

The present invention has now been described with reference to preferred embodiments thereof. The foregoing detailed description has been given for clarity and understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein.

What is claimed is:

1. A method for installing a curtain wall structure comprising:
    providing a sill member comprising a U-shaped channel section for receiving a glazed wall panel therewithin, an anchoring section spaced inwardly of and immediately adjacent to the channel section, said anchoring section including at least one opening for receiving means for securing the sill member to a concrete slab; and an enclosed wireway for power and/or data/telecommunication cables separate and distinct from the anchoring section, disposed inwardly of both the channel section and the anchoring section, and integrated therewith;
    inserting means for securing the sill member into the at least one opening of the anchoring section and thereby securing the sill member to the concrete slab;
    arranging power and/or data/telecommunication cables within the enclosed wireway; and
    arranging a glazed wall panel within the channel section.

2. The method according to claim 1, wherein said anchoring section defines a channel including said at least one opening.

3. The method according to claim 1, wherein said enclosed wireway includes at least one divider panel, thereby defining at least two separated wire channels.

4. The method according to claim 1, wherein said enclosed wireway includes an inwardly open recess and a cover therefor.

5. A method for installing a curtain wall structure comprising:
    providing a sill member comprising a U-shaped channel section for receiving a glazed wall panel therewithin, an anchoring section spaced inwardly of and immediately adjacent to the channel section, said anchoring section including at least one opening for receiving means for securing the sill member to a concrete slab; and an enclosed wireway for power and/or data/telecommunication cables separate and distinct from the anchoring section, disposed inwardly of both the channel section and the anchoring section, and integrated therewith;
    inserting means for securing the sill member into the at least one opening of the anchoring section and thereby securing the sill member to the concrete slab;
    arranging power and/or data/telecommunication cables within the enclosed wireway; and
    arranging a glazed wall panel within the channel section;
    wherein said enclosed wireway includes an inwardly open recess and a cover therefor and a plurality of outlet devices provided in said cover.

6. The method according to claim 1, wherein said enclosed wireway extends horizontally or vertically.

7. A method for installing a curtain wall structure comprising:
    providing a sill member comprising a channel section for receiving a glazed wall panel therewithin, an anchoring section spaced inwardly of and immediately adjacent to the channel section, said anchoring section including at least one opening for receiving means for securing the sill member to a concrete slab; and an enclosed wireway for power and/or data/telecommunication cables separate and distinct from the anchoring section, disposed inwardly of both the channel section and the anchoring section, and integrated therewith;
    inserting means for securing the sill member into the at least one opening of the anchoring section and thereby securing the sill member to the concrete slab; and
    arranging a glazed wall panel within the channel section.

8. The method according to claim 7, further comprising arranging power and/or data/telecommunication cables within the enclosed wireway prior to securing the sill member to the concrete slab.

* * * * *